United States Patent [19]

Sadler et al.

[11] 4,058,958
[45] Nov. 22, 1977

[54] METHOD AND MEANS FOR CONVERTING A CROP PICKUP ON A CROP PROCESSING MACHINE BETWEEN FIELD AND TRANSPORT MODES

[75] Inventors: Loren G. Sadler, Stevens; Aquila D. Mast, Lancaster, both of Pa.

[73] Assignee: Sperry Rand Corporation, New Holland, Pa.

[21] Appl. No.: 670,191

[22] Filed: Mar. 24, 1976

[51] Int. Cl.² ............................................ A01D 75/22
[52] U.S. Cl. ....................................... 56/228; 56/15.6; 56/DIG. 2; 56/DIG. 9; 280/415 R
[58] Field of Search ......... 56/228, 2, DIG. 9, DIG. 2, 56/15.6; 280/415 R, 415 A; 172/240

[56] References Cited

U.S. PATENT DOCUMENTS

| | | | |
|---|---|---|---|
| 3,304,698 | 2/1967 | Herbsthofer | 56/228 X |
| 3,638,406 | 2/1972 | Scherer r et al. | 56/2 X |
| 3,683,605 | 8/1972 | Jakobi | 56/228 |
| 3,841,943 | 7/1958 | Dumanowski | 56/2 X |
| 3,936,994 | 2/1976 | Mortier et al. | 56/228 |

FOREIGN PATENT DOCUMENTS 3,035,270   2/1971   Germany ........................... 56/DIG.9

*Primary Examiner*—Jay N. Eskovitz
*Attorney, Agent, or Firm*—Michael R. Swartz; Frank A. Seemar; John B. Mitchell

[57] ABSTRACT

A tractor mounted forage harvester includes a transverse hitch bar or frame, a crop processing unit mounted on the frame and a windrow pickup unit releasably attached to the front of the crop processing unit during the field operating mode. The total width of the harvester is reduced when converted to the transport mode by uncoupling the pickup unit, moving the same to the rear of the processing unit and the tractor, and coupling it to the frame via a subframe mounted thereon such that the major axis of the pickup unit is maintained in the same transverse relationship to the direction of movement of the forage harvester as when the unit is attached to the front of the processing unit.

12 Claims, 5 Drawing Figures

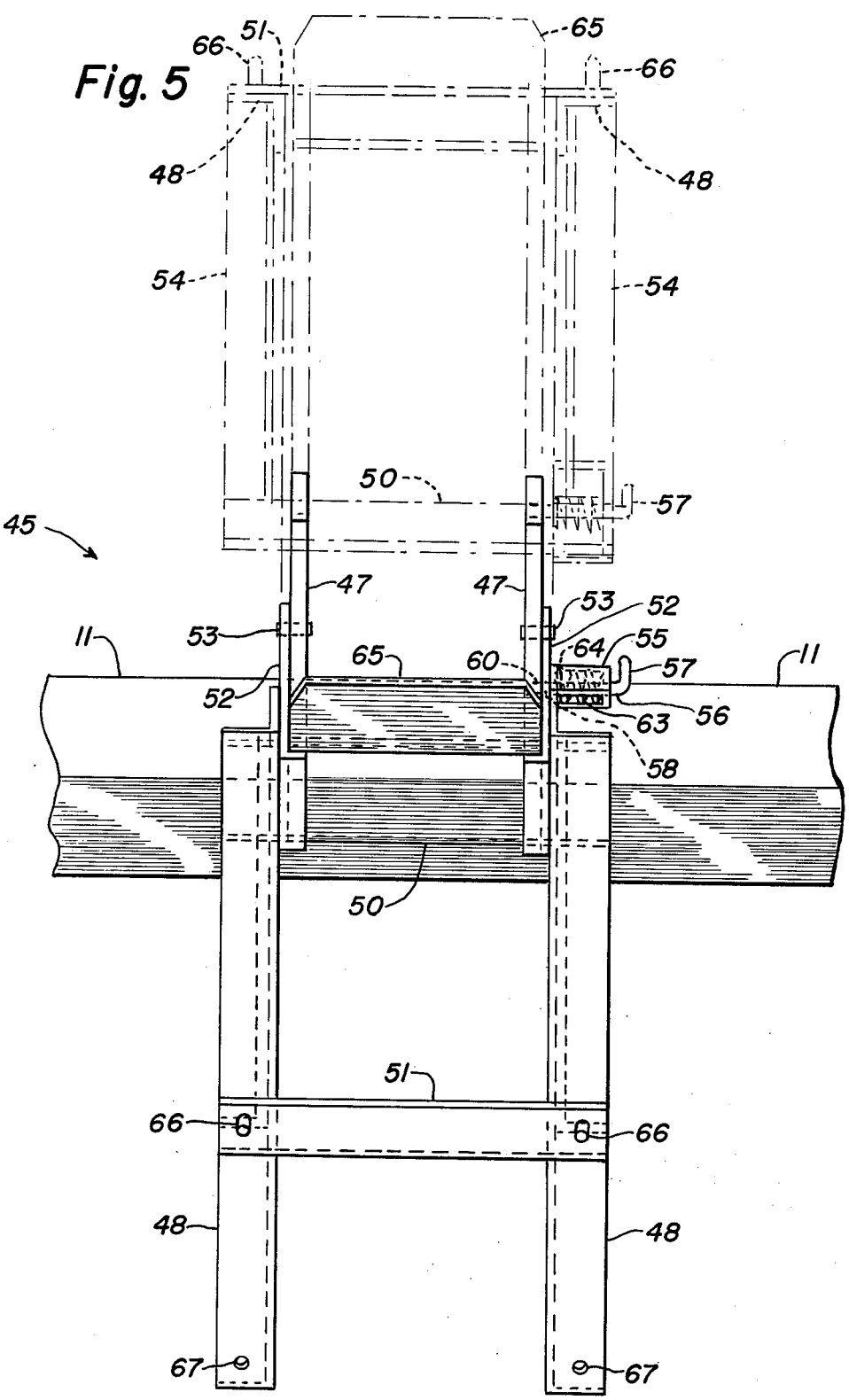

METHOD AND MEANS FOR CONVERTING A CROP PICKUP ON A CROP PROCESSING MACHINE BETWEEN FIELD AND TRANSPORT MODES

BACKGROUND OF THE INVENTION

1. Field of the Invention

The present invention relates generally to machines for processing crop material, such as forage harvesters, and, more particularly, is concerned with means for converting a crop material delivery means, such as windrow pickup, on the machine between field and transport modes.

2. Description of the Prior Art

A crop material processing or harvesting machine, such as a forage harvester, combine, windrower or the like, commonly utilizes a crop delivery means, such as a crop material pickup, which is mounted on the front of the machine and extends laterally beyond one or both sides of the machine in order that a swath of crop material, substantially wider than the machine, may be delivered by the means from the field to the machine. The utilization of the aforementioned type of pickup presents difficulties when it is desired to transport such machine along public or other roads, over narrow bridges or through narrow field gates between harvesting operations.

Several methods have been employed to convert the delivery means from a field operating mode wherein the machine has a predetermined width to a transport mode wherein the width of the machine is less than the predetermined width and thereby avoid the difficulties of transporting such machine.

One method found in the prior art has been to pivotally couple the delivery means to the machine so that it can be folded from a field operating mode wherein it extends transverse to the direction of travel of the machine to a transport mode wherein the delivery means extends along the side of the machine parallel to the direction of travel, such as illustrated and described in U.S. Pat. Nos. 1,930,855 and 1,972,783.

Another method in the prior art is shown and described in U.S. Pat. No. 3,683,605 wherein the delivery means, a combine header, is releasably coupled to the front of the combine in a field operating mode and has an axis transverse to the direction of travel of the combine. The header has been provided with a set of wheels mounted on each end thereof such that it may be towed behind the combine, in a transport mode, having its axis generally parallel to the direction of combine travel.

Yet another method found in the prior art has been to pivotally mount a delivery means, extending laterally beyond one side of the machine in the field operating mode, such that it may be pivoted upwardly about its pivotal axis, toward the machine, in a transport mode. One example of such a converting means is illustrated and described in the recently issued U.S. Pat. No. 3,936,994, owned by the present assignee.

While the aforementioned prior art methods appear to satisfactorily avoid the difficulties associated with the transporting of such machine, the present invention sets forth yet another method and means for transporting the machine which is an improvement over the art in that it provides a simpler construction and more durable arrangement.

SUMMARY OF THE INVENTION

The present invention sets forth an improved means for converting a crop processing machine between a field operating mode having a predetermined width to a transport mode having a width less than the predetermined width.

Accordingly, in a machine for processing crop material during movement across a field and being of the type which includes a frame, a crop material processing means mounted on the frame and means for delivering crop material from the field to the crop processing means, an improved means of the present invention for converting the machine between a field operating mode and a transport mode broadly comprises first means for coupling the delivery means in a field operating mode forwardly of the crop processing means in a predetermined orientation with its major axis transverse to the direction of machine movement and second means, cooperable with portions of the first means, for coupling the delivery means in a transport mode rearwardly of the crop processing means such that the major axis of the delivery means is transverse to the direction of machine movement, whereby the width of the machine in the transport mode is less than the width of the machine in the field operating mode.

More particularly, the first coupling means includes a hook-shaped support member, mounted to and projecting outwardly from the front of the processing means and adapted to be received within a discharge opening defined in the rear wall of the delivery means for supporting the delivery means in the field operating mode. The second coupling means includes a subframe mounted on a portion of the frame rearwardly of the processing means and having a coupling member, similar in shape to the hook-shaped support member, mounted to and projecting outwardly from a main body portion of the subframe, the coupling member being adapted to be received within the discharge opening of the delivery means for supporting the delivery means in a transport mode.

Still further, the improved converting means includes a ground engaging wheel mounted on a lower portion of the delivery means for partially supporting the delivery means in its field operating and transport modes.

The present invention also is directed to the method of converting a delivery means of an agricultural processing machine between a field operating mode wherein the machine has a predetermined width, to a transport mode wherein the machine has a width less than the predetermined width.

The method of the present invention for converting the machine between its field operating mode and transport mode broadly comprises the steps of uncoupling the delivery means from a first location forwardly of a crop processing means of the machine, relocating the delivery means to a second location rearwardly of the crop processing means such that an outer side of the delivery means is disposed inwardly from an outer side of the crop processing means, and coupling the delivery means in its second location to the rear side of the processing means in a supporting relationship for transporting the delivery means in its transport mode.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following description reference will be frequently made to the attached drawings in which:

FIG. 5 is an enlarged view of the coupling subframe as seen along lines 5—5 in FIG. 4, showing the subframe in solid line form in the lowered coupling position and in broken line form in the raised storage position.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left," "upwardly," etc., are words of convenience and are not to be construed as limiting terms.

IN GENERAL

Figure 1:
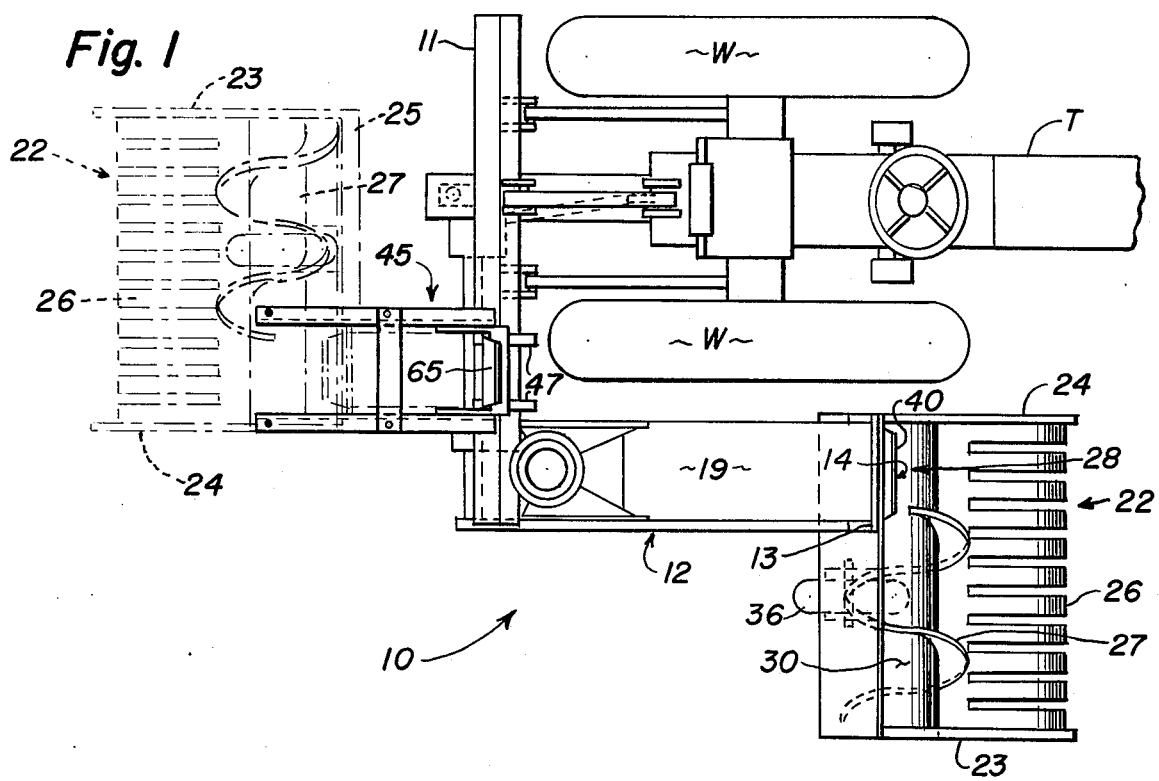
FIG. 1 is a plan view of a forage harvester, mounted on a tractor, embodying the principles of the present invention wherein a windrow pickup unit, as shown in solid line form, is disposed adjacent the right wheel of the tractor in the field operating mode and, as shown in broken line form, is disposed rearwardly of the tractor in a transport mode.

Referring now to the drawings, and particularly to FIG. 1, a mobile agricultural machine, such as a forage harvester, generally indicated by the numeral 10, is shown for illustrational purposes as incorporating the improved converting means of the present invention. Although, the improved converting means is shown as being incorporated in a forage harvester of the type mounted on the rear end of a tractor T and disposed in a side-by-side relationship to one of a pair of rear tractor wheels W, it will become apparent to those skilled in the art that the improved converting means of the present invention is not specifically limited, in its potential applications, solely to tractor-mounted forage harvesters, nor, for that matter, generally limited to forage harvesters of varying types, but may be applied or adapted to the general class of mobile agricultural machines, such as, in addition to forage harvesters, to combines, mowerconditioners, windrowers or the like, as desired.

More particularly, in referring to FIG. 1, the forage harvester 10 is of the type having a transverse hitch beam 11, one end of which being mounted by suitable mounting components to the 3-pitch hitch of the tractor T, the other end of the transverse hitch beam 11 supporting a crop processing means, generally indicated by the numeral 12, in a spaced relation adjacent the right wheel W of tractor T.

The major operative components of the crop processing means 12 are enclosed in a crop chopping chamber 19 defined by a front wall 13 having a crop material receiving opening 14, which allows delivery of crop material in a rearwardly direction, from right to left in FIG. 1, into a pair of transversely-extending, counter-rotating, front feed rolls 15, 16 located within the chamber adjacent the receiving opening 14. The front feed rolls 15, 16 receive the crop material and move it rearwardly therebetween to a pair of transversely-extending, identically counterrotating, rear feed rolls 17, 18 that feed the crop material to a cutter mechanism 20 which chops the crop material into small pieces. The cutter mechanism 20 discharges the chopped crop material through a transition member (not shown) to a discharge spout 21 for ultimate delivery to a truck or trailing wagon (not shown). Since the operative components of the forage harvester 10 form no part of this invention and are well known in the art, further detailed discussion thereof is omitted.

Figure 2:
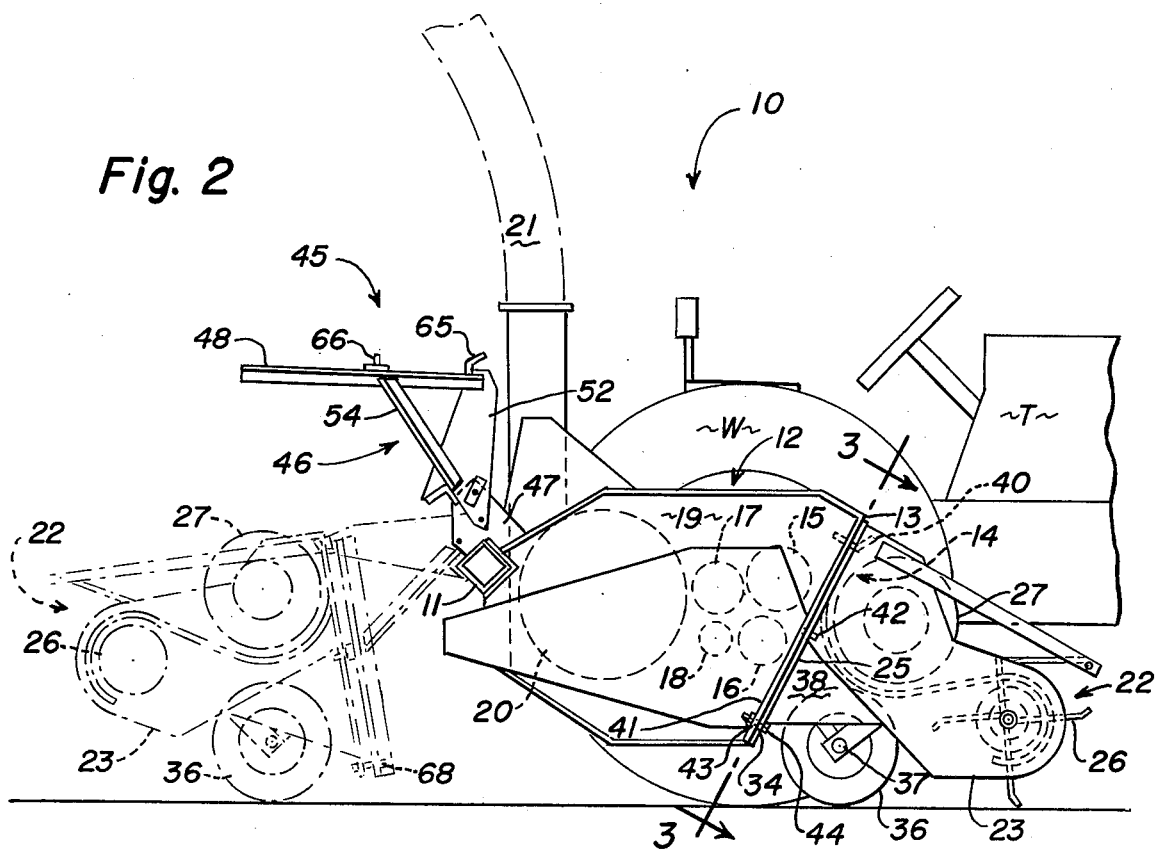
FIG. 2 is a side elevational view of the forage harvester of FIG. 1, showing the windrow pickup unit in solid line form in the field operating mode and in broken line form in the transport mode.

Crop material is delivered from the field to the crop processing means 12 by some type of delivery means, such as the windrower pickup attachment as shown in solid line form in FIGS. 1 and 2 of the drawings and generally indicated by the numeral 22. While the windrow pickup attachment 22 is one type of delivery means wherein the improved converting means of the present invention is applicable, other types of delivery means could also be readily adapted for using this invention.

The windrow pickup attachment 22 is conventional and includes a housing defined by an outer sidewall 23, an inner sidewall 24 and a rear wall 25. Rotatably mounted between the forward ends of the outer and inner sidewalls 23, 24 is a pickup component 26 which picks the crop up from the field and directs it rearwardly to a rotating auger component 27 transversely disposed between the rear portions of the sidewalls, rearwardly and above the pickup component 26. The auger component 27 receives the material from along the pickup component 26 and laterally from right to left, as seen in FIG. 1, feeds the material along the rear wall 25 of the housing to a discharge opening 28 defined in the left side of the rear wall 25. Retractable fingers 31 suitably mounted within and projecting from the auger cylinder 30 deliver the laterally feeding crop material through the housing discharge opening 28 and concurrently through the receiving opening 14 of the processing chamber 19 and then to the front feed rolls 15, 16 as described hereinbefore.

Power for driving the operative components of the pickup attachment 22 and the crop processing means 12 is generally supplied by the power takeoff of the tractor T being interconnected to a gearbox (not shown) mounted to the transverse hitch beam 11 near the rear end of the processing chamber 19 by a power transmission shaft (not shown) running generally parallel to and below the transverse hitch beam 11.

On the outer right side of the processing chamber 19 are exposed suitable sprockets (not shown) fixed to respective shafts of the front and rear feed rolls 15, 16, the cutter mechanism 20 and other mechanisms for discharging the chopped crop material from the chamber 19, which sprockets are drivingly coupled by a chain to a drive sprocket (not shown) on an output shaft (not shown) of the gearbox.

On the inner left side of the forage harvester 10 are exposed suitable arrangements of chains and sprockets (not shown) for intercoupling shafts of the pickup attachment 22, the auger 27, and the mechanism of retractable feed fingers and pulley and sheaves (not shown) for drivingly coupling another output shaft (not shown) of the gearbox to the chain and sprockets through a drive shaft (not shown) of the delivery means.

COUPLING STRUCTURE FOR FIELD OPERATING MODE

In the field operating mode, the pickup attachment 22 (as shown in solid line form in FIGS. 1 and 2) is supported in a generally horizontal plane forwardly of the crop processing means 12 and has its major axis disposed transverse to the direction of travel of the harvester 10. The left side 24 of the pickup attachment 22 is disposed a predetermined distance outwardly from the right wheel W of tractor T and the right side 23 extends substantially beyond the right side of the crop processing means 12.

Figure 3:
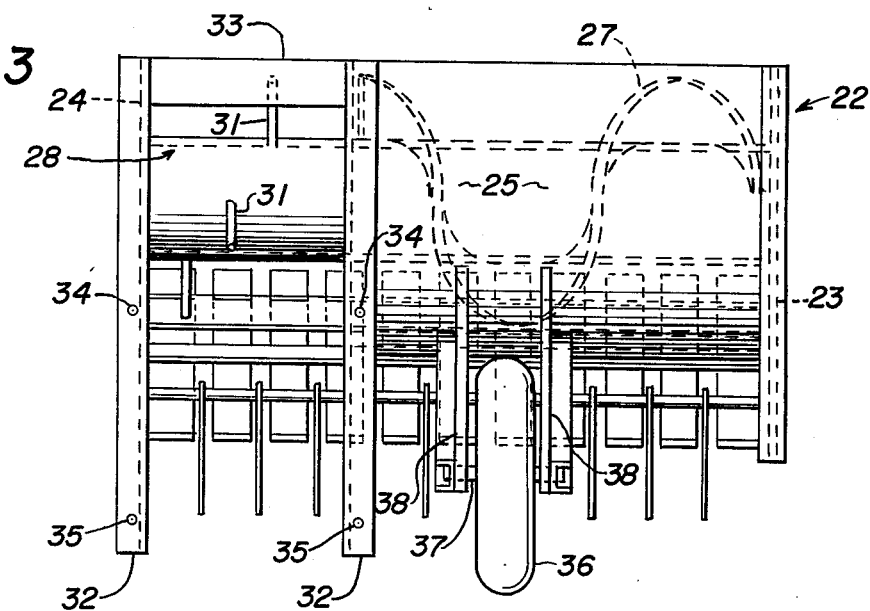
FIG. 3 is an enlarged rear view of the windrow pickup unit taken along line 3—3 of FIG. 2.

The structure for releasably coupling or attaching the pickup attachment 22 to and forwardly of the crop processing means 12 is partially shown in each of FIGS. 1, 2 and 3. As viewed in FIG. 3, a pair of spaced apart upright bars 32 are secured to the outer surface of the rear wall 25 adjacent the outer and inner edges of the discharge opening 28 of the pickup attachment 22. Adjacent the top edge of the discharge opening 28 and spanning between the upper end portions of the upright bars 32 is a cross bar 33. Each upright bar 32 is provided with an aligning hole 34, midway between the ends of the bar 32 and a latching hole 35 defined in the lower end portion of the bar 32, below the aligning hole 34.

Further, the pickup attachment 22 is provided with a ground engaging wheel 36 mounted from and carried by the lower rear wall 25. The wheel 36 is rotatably mounted by an axle 37 which extends between respective lower apices of a pair of spaced apart, generally V-shaped, support plates 38.

A hooked-shaped support member 40, best seen in FIGS. 1 and 2, is mounted to the front wall of the crop processing chamber 19, adjacent the upper edge of the receiving opening 14 of the crop processing means. The support member 40 extends generally outwardly and upwardly from the front chamber wall and is of a transverse width suitable to be received within the discharge opening 28 defined in the rear wall 25 of the pickup attachment 22. On the forward edge corners of the crop processing chamber 19 is an angle iron 41 having one leg flush with the front wall of the chamber 19 and adjacent the side edge of the receiving opening 14 and the other leg secured to the sidewall. Midway on each of the angle irons are aligning pegs 42 that project outwardly therefrom and are of a diameter suitable to be received within the respective aligning holes 34 provided in the upright bars 32 of the pickup attachment 22. Disposed below the aligning pegs 42 are a pair of latching holes 43 corresponding to the latching holes 34 of the pickup attachment 22.

The coupling or attaching operation is a very simple procedure. The windrow pickup attachment 22 is moved and oriented to its respective position forwardly of the processing means 12 and adjacent the tractor T. The attachment 22 is raised and tilted forward toward the front wall of the processing chamber 19 to thereby guide the discharge opening 28 over the hooked-shaped support member 40 of the processing means 12 such that the hook-shaped support member 40 extends through the discharge opening 28 and around the top cross bar 33. As the pickup attachment 22 is lowered, the cross bar 33 slides into an wedging relationship with the support member 40. The interengagement of the aligning pegs 42 with the respective aligning holes 34 provides proper alignment of the pickup attachment 22 on the processing means 12 and thereby insures proper communication of the discharge opening 28 with respect to receiving opening 14 of the processing means 12. To prevent the pickup attachment 22 from separating from the processing means 12, as the harvester 10 is moved across the field in the field operating modes, a suitable latching means such as a bolt 44 is extended through the respective latching holes 35, 43 of the pickup attachment 22 and the processing means 14.

Thus, it is seen that the pickup attachment 22 is releasably coupled to and mounted forwardly of the processing means 12 in the field operating mode by the engagement of the hook-shaped support member 40 and the discharge opening 28 and that proper alignment and orientation thereof is obtained by the respective aligning pegs 42 and aligning holes 34. Further, the pickup attachment is secured in its field operating mode by the latching means described. Although, the majority of the weight of the pickup attachment is supported by the hook-shaped member 40, part of the weight thereof is supported by the ground engaging wheel 36 whose primary function is to guide the pickup attachment 22 over ground irregularities.

IMPROVED CONVERTING MEANS

The improved means for converting the forage harvester 10 from its field operating mode, as shown in solid lines in FIGS. 1 and 2, to its transport mode, as shown in broken lines in FIGS. 1 and 2, basically comprises coupling means, generally designated by the numeral 45, which couples the pickup attachment 22 rearwardly of the crop processing means 12 on the transverse hitch beam 11 with its major axis transverse to the direction of machine movement such that the width of the forage harvester 10 in its transport mode is less than the width of the forage harvester 10 in its field operating mode.

The coupling means 45 includes a subframe 46 (best shown in FIGS. 4 and 5) and mounting means in the form of two spaced apart plates 47 for mounting the subframe 46 on the right side of the transverse hitch beam 11, inwardly of the crop processing means 12 and rearwardly of the tractor T. The subframe 46 includes a main body portion in the form of two spaced apart angle bars 48, a top lateral brace 50 connecting the upper ends thereof and a cross brace 51 extending across the midsections thereof. The subframe 46 further includes a pair of side plates 52, each of which extends in a generally transverse relationship to the main body portion and having one of its ends secured to one end of one of the angle bars 48. The other end of each side plate 52 extends along the outer side of respective mounting plates 47 and is pivotally connected thereto by a suitable fastening device, such as a mounting pin 53, such that the subframe 46 can be moved relative to the transverse hitch beam 11 between a raised storage position and a lowered coupling position. Diagonal braces 54 extending between the midsection of the angle bars 48, adjacent the cross brace 51, and the rear section of the mounting plates 47 are provided to add rigidity to the subframe 46. The lower rearward corner of the side plates 52 are shaped to conform to the upper edge portion of the transverse hitch beam 11.

Figure 4:
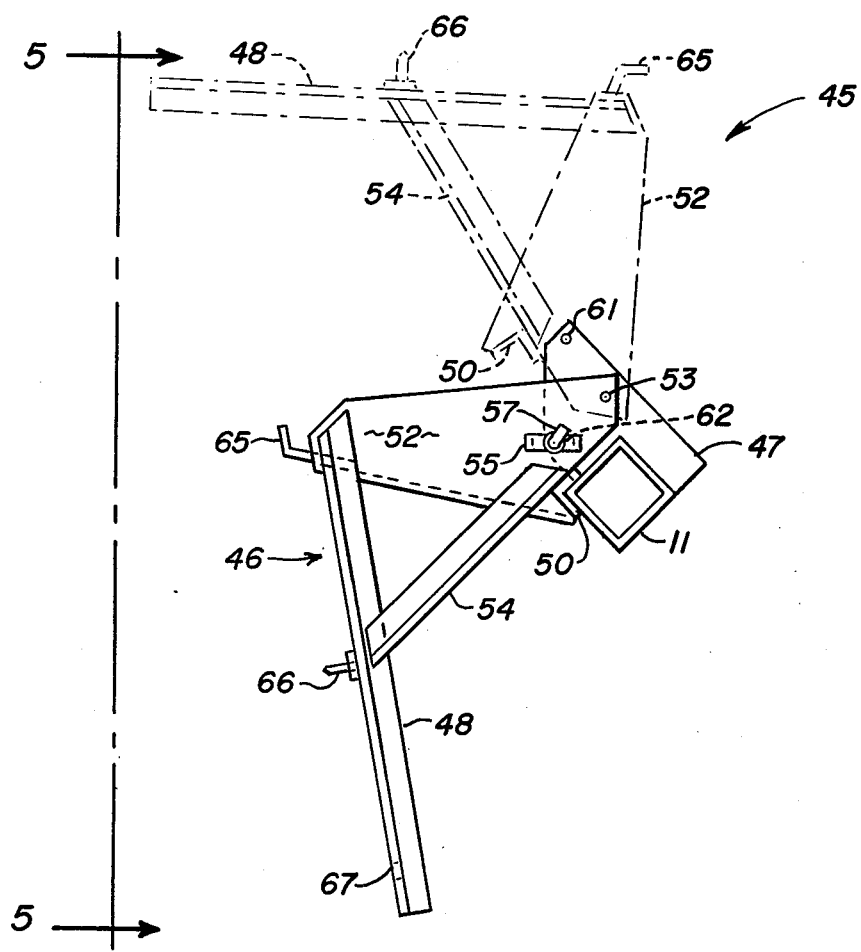
FIG. 4 is an enlarged side elevational view of the coupling subframe mounted on the transverse hitch beam (with the forage harvester being omitted for purpose of clarity) and being shown in solid line form, in a lowered coupling position and in broken line form in a raised storage position.

As viewed in FIG. 4, the subframe 46 is pivoted about the mounting pin 53 from a lowered coupling position, represented in solid line form, to a raised storage position, represented in broken line form. To maintain the subframe 46 in either of its raised or lowered positions, a U-shaped bracket 55 supporting a spring-engaging fastening pin 56 is secured to the right side plate 52. The fasting pin 56 has a handle portion 57 and a plunger portion 58 which extends through a hole 60 in the side plate 52. The right mounting plate 47 is provided with complementary first and second holes 61, 62 representing raised and lowered position for accepting the plunger portion 58 of the fastening pin 56. A spring 63 is coiled about the plunger portion 58 between the bracket 55 and a washer 64 secured to the plunger portion 58 adjacent the side plate 52.

To move the subframe 46 from its raised storage position as represented in broken lines in FIG. 4, the fastening pin 56 is pulled outwardly, from left to right, thereby retracting the plunger portion 58 of pin 56 from the raised positioning hole 61 and the subframe 46 is lowered to its coupling position. The spring 63, now under compression, urges the plunger portion 58 inwardly to seat within the lowered positioning hole 62 in the mounting plate. Thus, the subframe 46, is maintained in its lowered coupling position by the fastening pin 56 and is prevented from further rearward movement by the abutting engagement of the lower rearward corners of the side plates 52 with the top edge portion of the transverse beam hitch 11.

Further, in reference to FIG. 4, the coupling means 45 further includes a coupling support hook 65, similar to the support member 40 of the processing means 12, extending generally outwardly and upwardly from the top lateral brace 50 of the main body portion of the subframe 46. The coupling support hook 65 is adapted to be received within the discharge opening 28 of the pickup attachment 22 for supporting the attachment 22 rearwardly of the processing means 12 in a transport mode.

Aligning means is provided in the form of a pair of aligning pegs 66, each of which is secured to and projects outwardly from a respective end of the cross brace 51 which extends across the midsection of the angle bars 48. The aligning pegs 66 are so positioned on the cross brace 51 to be received by the aligning holes 34 on the rear wall 25 of the pickup attachment 22 to properly align the pickup attachment 22 on the subframe 46 such that the inner sidewall 24 of the attachment 22 is disposed inwardly from the outer sidewall of the processing means 12.

Latching holes 67 are further provided on the lower end portions of the angle bars 48 of the subframe 46 to mate with the latching holes 35 on the pickup attachment 22 when the pickup attachment is coupled to the subframe.

The pickup attachment 22, in the transport mode, as shown in broken line form in FIGS. 1 and 2, is coupled to the subframe 46 by the interengagement of the coupling hook 65 around the cross brace 33 of discharge opening 28 defined in the rear wall 25 of the pickup attachment. The aligning pegs 66 on the subframe 22 are extended through the complementary aligning holes 34 and bolts 68 are passed through the cooperating latching holes 32, 67. The majority of the weight of the pickup attachment 22 being supported by the coupling hook 65; however, part of the weight thereof is supported by the ground engaging wheel 36.

CONVERTING OPERATION

Converting the forage harvester 10 from a field operating mode, as shown in solid line form in FIGS. 1 and 2, wherein the forage harvester is of a predetermined width, to a transport mode, as shown in broken line form in FIGS. 1 and 2, wherein the forage harvester is of a width less than the predetermined width, is a very simple operation due to the improved converting means 45 as described above.

When the forage harvester 10 is in the field operating mode, the pickup attachment 22 is attached by the above noted coupling structure forwardly of the processing means 12 and is disposed a predetermined distance outwardly from the right wheel W of the tractor T. The major axis of the attachment 22 extends transverse to the direction of machine travel with the right outer side 23 of the pickup attachment 22 extending outwardly beyond the outer sidewall of the processing means 12. Thus, the field width of the harvester 12 is effectively the transverse distance between the outer right sidewall 23 of the pickup attachment and the extreme left portion of the tractor T which ordinarily would be the left rear tractor wheel W. In this mode, the subframe 46 is normally carried in its raised storage position.

To uncouple or detach the pickup attachment 22 in the field operating mode from the processing means 12, the latching means, or bolts 44, are first unsecured. The attachment is then raised upwardly to slide the cross bar 33 out of engagement with hook support member 40. Instead of raising the pickup attachment 22 for the disengagement of the hook support member 40 and cross bar 33, the transverse hitch beam 11 and thus the processing means 12 may be lowered by the hydraulics of the tractor T through the 3-point hitch arrangement.

Once uncoupled, the pickup attachment 22 is relocated to its transport location rearwardly of the machine in a coupling relationship with the subframe 46. In the relocating step, the operator either pulls or pushes the attachment 22 on the ground engaging wheel 36 to the rear of the processing means 12. The pickup attachment 22 is then rotated about its axis 180 degrees such that discharge opening 28 defined in the rear wall 25 of the attachment faces the coupling hook 65 of the subframe 46. Reversing the orientation of the pickup attachment 180 degrees from its field operating location can either be done prior to the relocating step or after it has been moved to its transport location. Further, it is quite obvious that instead of moving the pickup attachment 22 around to the rear of the harvester, one could just as well reverse the orientation of the harvester.

Prior to coupling the attachment 22 to the subframe 46, the subframe must first be lowered to its coupling position if it is in the raised storage position. To lower the subframe from the raised storage position to the lowered coupling position, the fastening pin 56 is pulled outwardly such that the end of the plunger portion 58 moves beyond the raised storage hole 61 defined in the mounting plate 47. The subframe is lowered and the fastening pin 56 is released whereby the coil spring 63 forces the plunger portion 58 thereof into engagement with the lowered coupling hole 62. The subframe is now secured in its lowered coupling position by the fastening pin and by the abutting engagement of the lower rearward corners of the side plates with the top edge portion of the transverse hitch beam.

Now, in the transport location, the pickup attachment 22 is tilted forward toward the subframe and raised slightly upwardly to guide the discharge opening 28 over the coupling hook 65. The aligning pegs 66 are extended through the corresponding aligning holes 34 whereby the attachment is properly positioned on the subframe and then suitable bolts 68 are passed through the matching latching holes 32, 67 to secure the attachment to the subframe for transporting thereof.

Thus, in the transport mode, the pickup attachment 22 is disposed rearwardly of the processing means 12, partially supported on the ground engaging wheel 36, and has its major axis still aligned transverse to the direction of machine movement. Further, the inner sidewall 24 of the attachment 22 is disposed inwardly from the outer sidewall of the processing means 12, thereby substantially decreasing the width of the machine in the transport mode.

It is thought that the invention and many of its attendant advantages will be understood from the foregoing description and it will be apparent that various changes may be made in form, construction and arrangement of the converting means and in steps of the converting method described without departing from the spirit and scope of the invention or sacrificing all of its material advantages, the form hereinbefore described being merely a preferred or exemplary embodiment thereof.

Having thus described the invention I claim:

1. In a mobile agricultural machine adapted to be moved by a vehicle, such as a tractor, forwardly over a field and being of the type including a frame detachably secured to said tractor, means mounted on said frame for processing crop material and delivering means releasably coupled to said crop processing means forwardly thereof and being disposed adjacent a side said tractor for delivering crop material to said crop processing means when said machine is in a field operating mode, the improvement comprising means for coupling said delivery means rearwardly of said processing means and said tractor for converting said machine to a transport mode whereby the width of said machine in said transport mode is less than the width of said machine in said operating mode, said coupling means including a support member extending rearwardly from said processing means and means on said delivery means adapted to register with said support member in a coupling relationship for supporting said delivery means in said transport mode, said coupling means further including a subframe mounted on said frame for movement between a storage position and a coupling position, said support member being mounted on said subframe for movement therewith.

2. In an agricultural machine for processing crop material during forward movement over a field and being of the type which includes a frame, means mounted on said frame for processing crop material and means for delivering said crop material from the field to said crop processing means, an improved means for arranging said machine in a field operating mode wherein said machine is of a predetermined width and a transport mode wherein said machine is of a width less than said predetermined width, said improved means for arranging comprising:
first means for coupling said delivery means to said crop processing means forwardly thereof for setting up said machine in its field operating mode, said first means includes an opening defined in a rear portion of said delivery means and a first support member projecting forwardly from a front portion of said processing means and adapted to register with said opening for arranging said machine in its field operating mode; and
second means cooperable with a portion of said first means for coupling said delivery means to said frame rearwardly of said crop processing means for converting said machine to its transport mode, said second means includes a second support member projecting rearwardly from said processing means and adapted to register with said opening in said rear portion of said delivery means for arranging said machine in its transport mode.

3. In a machine for processing crop material during movement across a field and being of the type which includes a frame, means mounted on said frame for processing crop material and means for delivering said crop material from the field to said crop process means, an improved means for converting said machine between field operating and transport modes which comprises:
means for coupling said delivery means to said crop processing means forwardly of said frame in said field operating mode whereby said machine has a predetermined width and to said frame rearwardly of said crop processing means in said transport mode whereby said machine has a width less than said predetermined width, the major axis of said delivery means in relation to the direction of travel of said machine being generally the same in both said operating and transport modes of said machine, said coupling means includes:
a subframe having a rearwardly projecting first support member, said subframe being mounted on said frame rearwardly of said processing means;
a second support member mounted on and projecting forwardly from said processing means; and
means on said delivery means adapted to register with said first support member for coupling said delivery means rearwardly of said processing means in said transport mode and with said second support member for coupling said delivering means forwardly of said processing means in said operating mode.

4. The machine as recited in Claim 3, wherein said subframe is mounted on said frame for movement between a storage position and a coupling position.

5. The machine as recited in Claim 3, wherein said subframe is mounted on said frame for pivotal movement between a raised storage position and a lowered coupling position.

6. The machine as recited in claim 3, wherein said subframe further includes means for aligning said delivery means on said subframe to thereby facilitate the coupling of said first support member and said register means.

7. The machine as recited in claim 3, wherein said register means includes an opening defined in a rear wall portion of said delivery means.

8. In a mobile agricultural machine adapted to be moved forwardly across a field and being of the type having a crop processing means and crop delivery means intended to be moved in relation to said crop processing means to convert said machine between field operating and transport modes, an improved converting means comprising:
first coupling means extending forwardly from said crop processing means; and second coupling means extending rearwardly from said crop processing means;

said delivery means including means adapted to register with said first and second coupling means at separate times to respectively facilitate coupling of said delivery means forwardly of said crop processing means for conversion of said machine to said field operating mode and rearwardly of said crop processing means for conversion of said machine to said transport mode, said register means includes an opening defined in the rear wall portion of said delivery means adapted to receive said first and second coupling means.

9. A method of locating an attachment as part of an agricultural machine and converting said agricultural machine from a field operating mode wherein said machine has a predetermined width to a transport mode wherein the machine has a width less than said predetermined width, said machine being of the type which includes a frame, means mounted on said frame for processing crop material and means for delivering crop material from the field to said processing means, the method comprising the steps of:

a. coupling said delivery means to a front portion of said processing means by inserting a first support member projecting forwardly from said processing means into registry with an opening defined in a wall portion of said delivery means for converting said machine to its field operating mode:

b. uncoupling said delivery means from said processing means a disengaging said first support member from said opening defined in said rear wall portion of said delivery means;

c. relocating said delivery means from its field operating mode location wherein said rear portion of said delivery means is adjacent said front portion of said processing means to a transport mode location wherein said rear portion of said delivery means is adjacent a rear portion of said processing means; and d. coupling said delivery means to said rear portion of said crop processing means by inserting a second support member projecting rearwardly from said crop processing means into registry with said opening defined in said rear wall portion of said delivery means for converting said machine to its transport mode.

10. The method of claim 9, further comprising the step of partially supporting said delivery means in said field operating and transport modes on a ground engaging wheel carried by a lower portion of said delivery means.

11. The method of Claim 9, further comprising the step of aligning said opening defined in said rear portion of said delivery means with a receiving opening defined in said front portion of said crop processing means for the passage of crop material therethrough.

12. The method of Claim 9, wherein the step of relocating further includes positioning said delivery means behind said processing means such that an axis of said delivery means extends in generally the same relationship with respect to the direction of machine movement as when said machine is in said field operating mode.

* * * * *